United States Patent [19]
Kabat et al.

[11] 3,810,096
[45] May 7, 1974

[54] METHOD AND SYSTEM FOR TRANSMITTING DATA AND INDICATING ROOM STATUS

[75] Inventors: Jules M. Kabat; James H. Beggs, both of Las Vegas, Nev.

[73] Assignee: Integrated Systems Company, Las Vegas, Nev.

[22] Filed: Sept. 14, 1972

[21] Appl. No.: 289,134

[52] U.S. Cl. .............................. 340/147 R, 340/310
[51] Int. Cl. ........................ H04b 13/02, H04q 11/00
[58] Field of Search ................. 340/147 R, 150, 310

[56] References Cited

UNITED STATES PATENTS

| | | | |
|---|---|---|---|
| 3,675,204 | 7/1972 | Miehle et al. | 340/147 R |
| 3,702,460 | 11/1972 | Blose | 340/150 |

*Primary Examiner*—Donald J. Yusko
*Attorney, Agent, or Firm*—Lowe, Kokjer, Kircher, et al.

[57] ABSTRACT

A method and system for transmitting data and indicating room status has a transmitter and a receiver utilizing the neutral and ground lines of a conventional AC room power line as a communications link. The transmitter sends coded signals through a wall outlet via the neutral and ground to the receiver and computer where it may be stored for eventual use. Transformers are bypassed from the secondary to the primary in the power distribution system. Data terminals provide a means for selectively displaying the received information as it relates to room status or alarm conditions. Additionally, status boards may be utilized with the received and stored data to visually display room status and conditions for front desk, housekeeping operations or supervisory stations.

The method of transmitting data and indicating room status includes the steps of encoding information relating to a room number and status, transmitting said encoded information on an AC power line using the neutral and ground of same, receiving said transmitted information, and indicating the status of said room.

15 Claims, 16 Drawing Figures

PATENTED MAY 7 1974 3,810,096

SHEET 5 OF 6

METHOD AND SYSTEM FOR TRANSMITTING DATA AND INDICATING ROOM STATUS

BACKGROUND AND BRIEF DESCRIPTION OF THE INVENTION

The use of room status indicating systems for hotels and motels has been contemplated and desired by owners and managers for a number of years. The prior art patents known to applicants which deal with this particular subject are Lurie U.S. Pat. No. 3,214,747; Gassenheimer et al. U.S. Pat. No. 3,028,020; Staton U.S. Pat. No. 3,254,335; Beilfuss U.S. Pat. No. 3,353,173; Head U.S. Pat. No. 3,588,868; and Woods U.S. Pat. No. 3,594,584. The present known state of the art in the hotel/motel industry and with respect to the hospital industry generally requires a personal investigation of the various rooms in order to monitor the condition and status of same. For instance, in a large hotel, an individual will generally check out of a room in one of two ways. The checkout may be accomplished at the front desk where the cashier knows of the checkout or, if the individual is prepaid, he can check out by merely locking the key in the room and walking out the door. The latter condition requires that the maids or the inspectors find out that a particular room is a checkout and, further, that this information be transferred to the front desk or cashier. Quite often, the maids or inspectors will make a list of the checkouts and will get on the phone to a housekeeping station, said station in turn phoning the front desk and informing the desk of the checkout condition. Likewise, if the checkout is made at the cashier or the front desk, this information must be transmitted to the inspectors and on to the maids so that the room may be readied for new guests and this information once again returned to a housekeeping station and from thence on to the front desk. It has been estimated by hotel managers that getting the above described information back and forth through the communication loop so that the front desk can rent a vacated and now clean room will take two and a half hours alone even with a most efficient crew. As a result a busy hotel may have many clean and available rooms that the front desk is unaware of. Additionally, the phone traffic to the front desk by the various inspectors in a busy and large hotel can be quite significant and often requires the hiring of extra personnel available merely to answer phones at each end of the necessary conversation.

More advanced systems have been constructed in the nature of Gassenheimer et al U.S. Pat. No. '020 and the Lurie signalling system U.S. Pat. No. '747. In these two patents and in related prior art systems, the maid cleans the room and informs an inspector who will then insert a key, card, or plug into some kind of wall receptacle. This receptacle is, in turn, directly hard wired to a status board either at a housekeeping station and/or at the front desk. The status board or light board will then indicate the status of the individual rooms by lights so that when the maid or inspector inserts the key or card into the outlet, the appropriate light(s) on the status board will become illuminated and indicate that the particular room is clean. Therefore, the front desk can visually observe the status board and rent a clean room to a guest providing the system is properly operating. Once the room has been rented, the front desk registrar will actuate a switch to indicate that the rented room is now occupied and the status board light(s) will go out. When the guest checks out the next day, and if the checkout is made at the front desk, the registrar can then operate a signalling system to a housekeeping station so that the maids would clean that particular room. However, if the checkout is part of a tour or prepaid the only way that the room status can be discovered is by the inspector checking the particular room. Present systems have no way for the inspector to insert this information into the communication loop since the maid's key or inspector's key and/or card will only indicate that the room is clean. As a result, the information must be again gathered and the front desk notified by telephone or in person. Furthermore, the cost of wiring each room of a Miami Beach or Las Vegas type large hotel/motel results in an enormous installation and labor cost. Also, in these large installations which may have as many as 3,000 light bulbs on a status board, a press-to-test check of the light bulbs is almost prohibitive in cost since every switch in the particular room would have to be duplicated at the central distribution system and every room switch would have to be periodically monitored to check on its operability.

Since the hard wiring of each room to a status board at the hotel front desk proves to be so great, other communications systems install coaxial cable just between housekeeping section and the front desk and still require individual room inspection and communication via telephone or hand carried charts or lists.

At equally important use of the subject method and apparatus is with hospitals. Now all room status information is transacted by phone and occupied, vacant and out-of-order rooms are manually tabulated and phoned to the admittance section of the hospital. Further, the problem of patient location can cause serious delays between the time that the doctor arrives at the hospital and when he actually sees his patient. Such a situation can be rectified by the present invention and by constant monitoring of the patient location which may be visually available at the nurse's station on each particular floor of the hospital. Also kitchens in large hospitals may be easily informed as to the number and type of meals to prepare for patients with special diets.

The above discussion clearly illustrates the difficulty in communicating in older buildings that are not specifically wired for room status type communication during the construction of same. Also, in new buildings, the present invention will obviate the need for additional communication links with the front desk or registrar in various types of hotel/motel, hospitals and office complexes be it for room status, alarm or occupant condition.

The ability to communicate over existing power lines has been attempted before and usually abandoned because of the difficulties in impedence matching and with the usual noise interference that would exist between the hot line of the communication link and neutral. Accordingly, the power line communication link was virtually abandoned as an economical system in large buildings. However, it has been discovered that an RF signal may be conveniently and economically transmitted over the 110–120 volt AC neutral and ground power lines. The neutral to ground lines are much quieter in terms of interfering noise and do not require that the phases be coupled together in two or three phase power distribution systems. When it is necessary to couple two or more distribution systems that are fed by the same 440–480 volt line, the RF communication signal may be coupled directly onto the 440–480 volt lines. Further, if a separate 440–480 volt distribution system exists for a larger building complex, the signal may be transferred from one system to another using a coaxial cable with the requisite transformers, bypasses and repeaters where necessary.

It is contemplated that by proper utilization of the existing AC power lines, and more particularly the neutral and ground of the conventional 110–120 volt systems, various types of information can be digitally encoded and transmitted from one end of a building complex to another. In such a system, a transmitter will be provided which may be plugged directly into a conventional 110–120 volt wall outlet. This transmitter will have a retractable power cord with a ground connection thereon and will include a plurality of room selector switches and a status selection switch. The room selector switches will be of the conventional star-wheel type so that the user of the transmitter may easily digitally encode the room number (usually a four digit number) on the room selector section. The room status switch will enable each room to have as many as ten (or more if needed) different statuses which could conceivably be any of the following: Status 1—clean; status 2—dirty; status 3—maid-in-room; status 4—ready for inspection; etc. A push-to-transmit and a transmit light will also be a part of the transmitter so that when the room selector switch is properly set to indicate the room number and the status switch indicates the proper status, the push-to-transmit button is depressed and the illumination of the transmit light indicates that the message on this particular transmitter has been sent.

An AC line receiver will receive the transmitted signal and will include suitably filtering and impedence line matching circuitry so that all unwanted frequencies are properly attenuated. The desired frequency is properly amplified and filtered again for utilization in a special purpose computer. Actually, the computer will include a storage memory, programmer and the AC power line receiver. A typical utilization of the storage memory in large hotels may call for three independent status fields for each room with each field containing four status conditions. The status conditions for the front desk of the hotel operation could include vacant, occupied, stay-over, call-when-ready, etc. while the status conditions for a housekeeping field may be clean, dirty, maid-in-room and ready-for-inspections, etc. The room descriptions including price, number of beds, decor, view, etc. may likewise be programmed in the memory with the memory also being expandable and easily modified.

The programmer operates in conjunction with the computer to control the various programs and enter and retrieve data from the memory and will receive and distribute requests for data from peripheral data terminals.

Peripheral data terminals may be of the input type or a master type and can be utilized with the system for processing information to and from the computer. The master data terminal will include a keyboard entry, room number display and an additional three (or more) digit display which will totalize the status conditions selected. Selector switches may have a double read out to show which status conditions have been selected and the present status of the room on the display. An operator may select any combination of status conditions that meet the present requirements and the number of rooms that meet these conditions will appear on the totalizer display. The room numbers may be advanced to display only on those rooms meeting the prescribed conditions as set forth by the status selector switches.

The input terminal is often located with a cashier and will have all the features of the master terminal xcept totalizer information and status selector switches.

Status board(s) using lights next to each room number may be used to visually indicate the various status combinations for each room and to conveniently display these status conditions at important operating stations such as the front desk or housekeeping in a large hotel/motel unit. Finally, a battery backup may be provided for the entire system whether operating with hotels, hospitals or any other building complex. In this fashion a power failure will not erase the information already stored as may occur in present systems.

One of the primary objects of the invention is to provide a unique method and apparatus for transmitting and indicating room status. It is a feature of the invention that existing power lines are usable as the data link between individual rooms and front desk operations, housekeeping, etc.

Another object of the invention is to provide a method and apparatus of the character described which is particularly adaptable to be utilized in hotels, motels, hospitals, office buildings and apartment complexes.

A further object of the invention is to provide a room status system of the character described which utilizes the neutral and ground of the AC power line for the communications link between individual rooms and processing equipment for data terminals.

A further object of the invention is to provide a unique method of transmitting data and indicating room status which includes the steps of encoding information relating to room number and status, transmitting said encoded information on an AC power line using the neutral and ground of same, receiving said transmitted information, and indicating the status of said room.

A still further object of the invention is to provide a unique method and apparatus for transmitting alarm conditions from an individual room or location to a central processing area. It is a feature of both the method and the apparatus that the conventional room AC power line is used as the communications link and that the data is transmitted over the neutral and ground of same.

A further object is to provide a unique recirculating memory for a room status system of the character described. It is a feature of the memory that digital information from systems other than a room status system may have utility therewith such as patient monitoring systems in hospitals, fire and burglar alarm systems and door lock control systems.

Another object of the invention is to provide in a room status system, uniquely constructed peripheral data terminals. It is a feature of these terminals that information for the system may be entered thereon and a visual read out provided to indicate status conditions of subject rooms.

A still further object of the invention is to provide a uniquely constructed portable data transmitter that is capable of being utilized with a room status and control system. It is a feature of the transmitter that data relating to room numbers and room status may be easily decoded in the transmitter and that the transmission of this information through the system may be accomplished by merely adjusting the plurality of rotary switches, plugging the power cord of the transmitter into a conventional AC wall outlet and depressing a push-to-transmit button located on the transmitter itself.

Another object is to provide a unique recirculating memory that has significantly reduced to circuitry required to store status data and to access this data according to room numbers.

Another object of the invention is to provide a room status and control system which transmits digital data in an RF band over conventional AC power lines in existing buildings.

A particularly important object of the invention is to provide telemetry concepts to conventional and existing AC power lines thereby substantially reducing the installation cost of room status and control systems for large hotels and the like.

A further object of the invention is to provide a room status and control system of the character described which utilizes an encoding and addressing scheme for room and status while at the same time incorporating relatively simple hardware implementation that has obviated the necessity and complexity of a general purpose computer.

A still further object of the invention is to provide in a room status and control system of the character described, a memory system that is easily tested and repaired using a minimal amount of ordinary lab equipment. It is a feature of the invention that a conventional oscilloscope may be used to test and trouble shoot the shift register(s) which may comprise a portion of the memory of the subject system and that extensive diagnostic testing or test software does not have to be utilized in this system.

Another object of the invention is to provide a unique room status and control system that includes a plurality of peripheral data terminals operating in such a fashion so as to reduce the communication problem normally associated with hospitals and hotels.

Another object of the invention is to provide a unique recirculating memory that is self-checking for circuit failures and provides an immediate display of the existence of the failure and which component has failed.

Another significant object of the invention is to provide a uniquely constructed room status and control system that enables the number of statuses per room or room area to be substantially increased over what is heretofore known. It is a feature of this object that any number of meaningful statuses may be assigned to a particular room and that as many statuses per room as desired may be easily utilized with an encoding portable hand transmitter with one thumb wheel switch. Further, it is not necessary to add additional hard wired transmission lines to increase the number of status allocations per room.

Another object of the invention is to provide a unique method for transmitting alarm information. The subject system is particularly helpful in isolating the exact location of an alarm condition even to the extent of identifying the particular station or room that initiated the alarm transmission.

A further object of the invention is to provide a unique method and system for indicating room status which will include a remote status board(s) that will be locatable at various information stations throughout a large hotel/motel complex or hospital. It is a feature of the invention that the data link between the status boards and the actual room or rooms in question will at least include a portion of the conventional AC power line that is already in existence and will require a minimal amount of additional wiring or separate circuits.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figures 6, 7, 12:
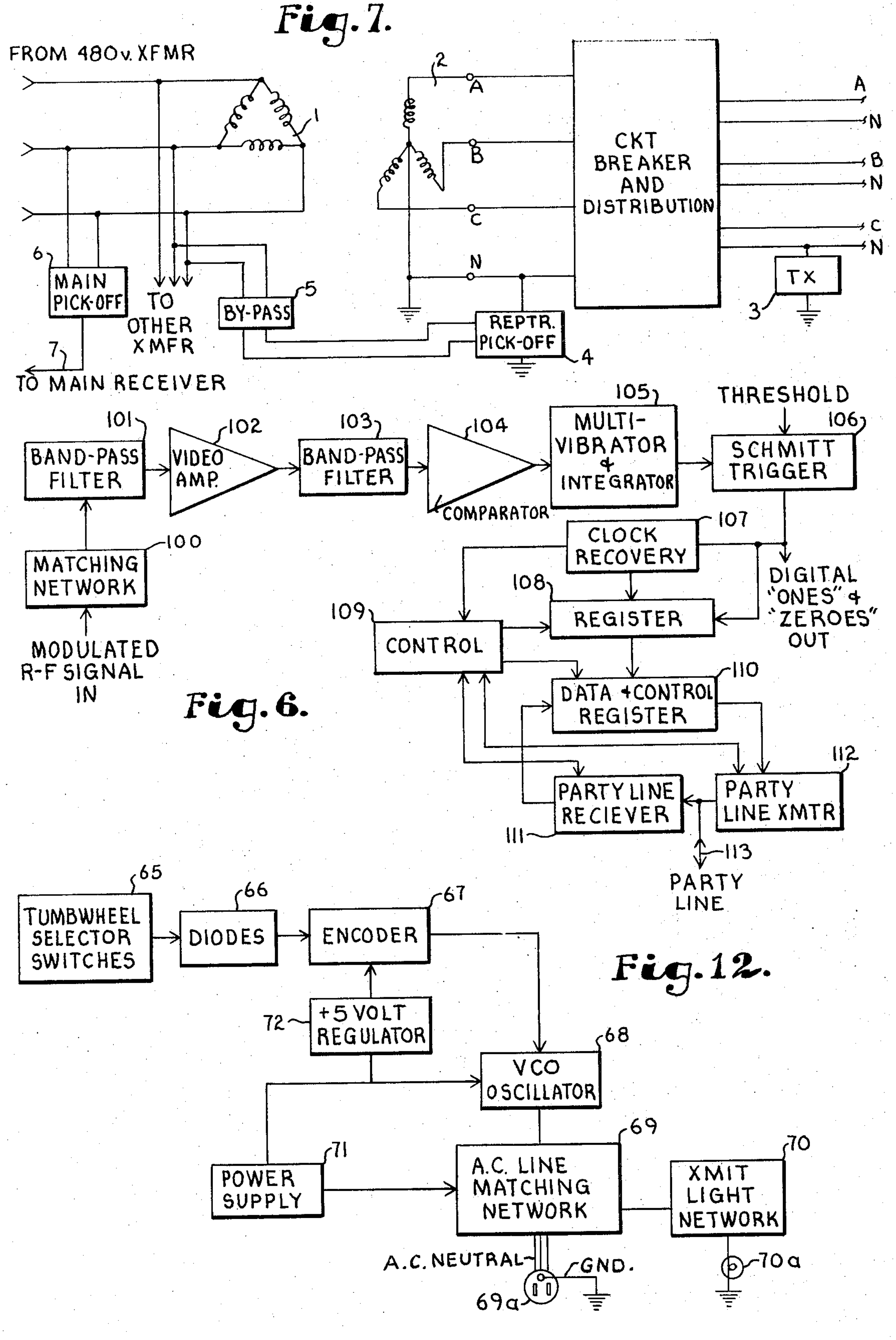
FIG. 6 is a block diagram showing the AC power line receiver circuitry.
FIG. 7 is a partial schematic diagram showing a typical distribution system including the bypass and pickup circuitry used with the unique data transmission link.
FIG. 12 is a block diagram showing an overall view of the portable transmitter.

Turning now more particularly to the drawings, FIG. 7 illustrates a normal three phase power distribution system with the primary of a distribution transformer indicated by the numeral 1 and the secondary indicated by the numeral 2. The secondary has the three phases A, B and C coming therefrom in conjunction with the neutral N that feeds into the distribution system through the usual circuit breakers. At this point, the AC power lines may be any combination of phases and neutrals and will normally be the power supply for the 110–120 volt AC outlets in a particular room or building area. As shown on the right hand portion of FIG. 7, the transmitter, generally indicated by the numeral 3, is selectively placed on the neutral to ground connection that would normally appear in the above mentioned room. A repeater or pickoff circuit identified by the numeral 4 will likewise be tied between neutral and ground at a convenient location some distance from the transmitter generally somewhere near the transformer secondary. Since the transmitted information will not pass through the transformer on the neutral to ground line, it is necessary to utilize a bypass 5 which in effect takes the transmitted data and puts same on the 440–480 volt lines. This portion of the distribution system (the primary side of the step down transformer) then provides a communications link to the main pickoff 6 which will eventually deliver the appropriate signal via line 7 to the main receiver.

Figure 8:
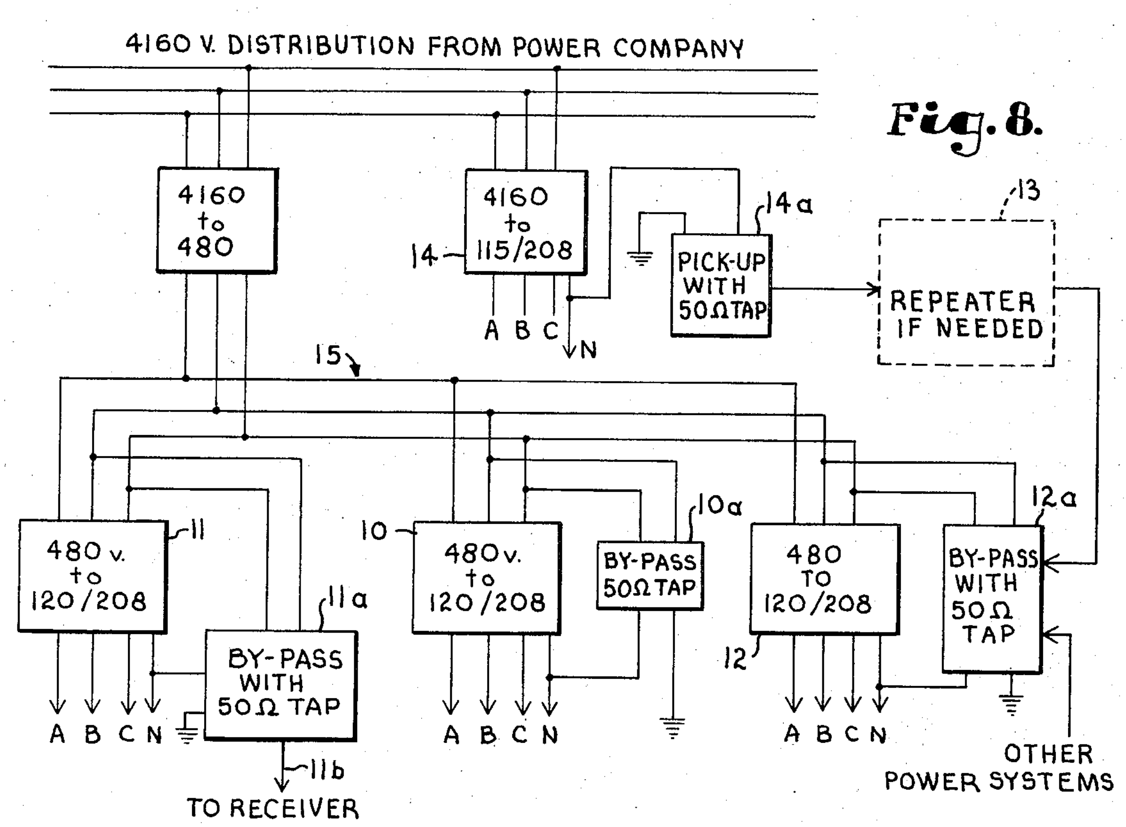
FIG. 8 is a typical multiple distribution system modified for use with the subject data communication link.

The power distribution system in FIG. 8 is another typical example of a power company providing 4160 volts (or any other convenient voltage) of distribution power to a plurality of transformers which step the 4160 down to the usual 480 or 440 volts. The 480 volt power will then be accordingly stepped down to 120/208 volt three phase power as described above with respect to FIG. 7. Each one of the 480 volt to 120 volt transformers may represent one section of the hotel that has a central circuit breaker box and central servicing for the smaller location. Likewise, each 480 to 120 volt transformer is bypassed by a device picking up signals on the AC neutral line and transferring them to the 440 volt distribution system using two of three wires or phases. FIG. 8 further indicates a transformer 10 feeding a hotel section with a number of rooms thereon and with that particular transformer (10) having a conventional bypass (described in more detail later) 10*a* located thereon. This is a typical utilization of the large number of transformers that are associated with existing hotel/motel power distribution.

The transmitted signal will be on the neutral going through the bypass 10*a* and coming up onto the 480 volt distribution system. The transformer, indicated by the numeral 11, will have a similar type bypass 11*a* but may use the additional feature of allowing the signals to go onto a 50 ohm coaxial line 11*b* directly to the receiver at the main processor. Transformer 12 has a bypass with a 50 ohm tap indicated by the numeral 12*a* however, this tap may be used to tie in with signals from outlying areas that are not serviced by a 480 volt distribution system. These outlying areas generally represent late acquisitions or additions onto a hotel/motel system that require power completely separate from the original main transformer.

It is sometimes desirable to install repeaters 13 onto a particular line to delay and re-transmit a signal that could conceivably become weakened. For example, signals that are time multiplexed for receiving and transmitting are considerably more valuable if received in proper strength. Accordingly, the repeater 13 acts to pick up the transmitted signal, decode same, cause a finite delay and then re-transmit the signal at a proper strength to the receiver or on the 480 volt distribution system.

Finally, some distributions systems may step directly down from 4160 to 115/208, same being indicated by the numeral 14. In this situation, the signal on the neutral may be directly picked off by the 50 ohm tap 14*a*, repeated if necessary and placed directly on the main 480 volt distribution system which is now generally represented by the numeral 15. It should be kept in mind that various installations, voltages and power distribution systems require a varying number of transformers, pick offs and repeaters and that the schematic block diagram shown in FIG. 8 is merely illustrative of a typical system utilizing the concept of neutral to ground communications.

Figure 5:
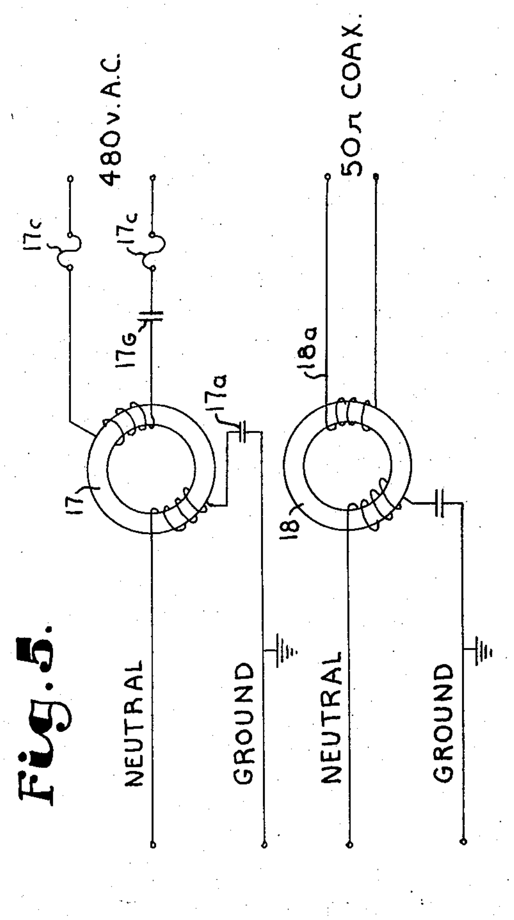
FIG. 5 is a partial schematic view of a typical bypass circuit that is utilized to carry information from the secondary side of the neutral to ground connection to the primary side of an associated transformer and with the lower drawing indicating a neutral to ground bypass going to a 50 ohm coaxial cable.

The bypass circuits mentioned above are shown in more detail in FIG. 5. The upper circuit, will include the neutral and ground lines being delivered to a toroid 17 which is used for its impedence matching capabilities. A capacitor 17*a* will be connected between ground and the primary winding on the toroid with a larger capacitor 17*b* and the fuses 17*c* located on the secondary side between toroid 17 and the 480 volt line. The lower circuit depicts toroid 18 being interconnected on its secondary with a 50 ohm coaxial cable 18*a*.

Figure 9:
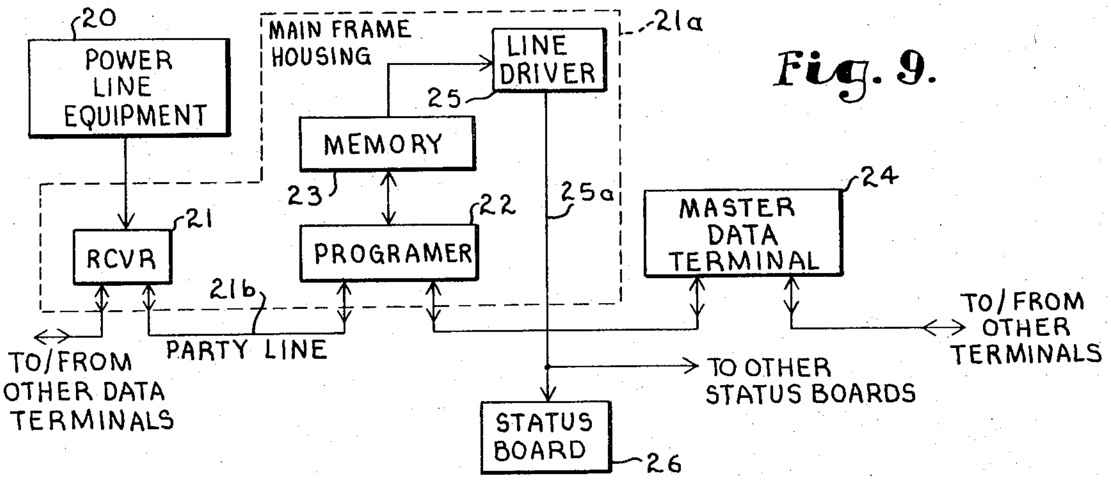
FIG. 9 is a block diagram illustrating the interrelationship of the various sub-systems.

As suggested above, a plurality of peripheral data terminals may be utilized with the subject system and will be operable for intercommunication in conjunction with the power line equipment which is diagrammatically indicated in FIG. 9 by the reference numeral 20. Actually, the block indicated by the numeral 20 is used to indicate the various pieces of equipment shown in FIGS. 2, 4 and 8. In any event, the power line equipment will deliver a signal to receiver 21. The receiver 21 may be located for convenience within the housing of a main frame computer as generally indicated by the numeral 21*a*. The receiver is interconnected with the party line 21*b* which is shared by all the data terminals as well as being tied into the programmer 22. The programmer functions to properly arrange and order the information taken from the receiver and the various data terminals and to properly feed that information into memory 23. Also, the programmer extracts the proper information from memory 23 as requested by the external peripheral data terminals and transmits this information thereto. These terminals may be of the master variety or they may be of the input type. These terminals are diagrammatically indicated by the numeral 24 in FIG. 9. The line driver 25 is also directly tied to the memory 23 and operates to take the status information of all of the various rooms and transmits same on a 50 ohm coaxial party line cable 25*a* to all of the various status boards 26 which may be scattered throughout an installation. The programmer acts to authorize the individual data terminals to communicate with it and the memory so that there is never an overlapping of data between terminals. If a room status is updated or changed from the vacant status to an occupied status, this status change is transmitted by the data terminals to the programmer. The programmer then selectively causes the information which has been updated to be stored in memory 23 and this status change is then transmitted back to and recorded on that data terminal.

Figure 1:
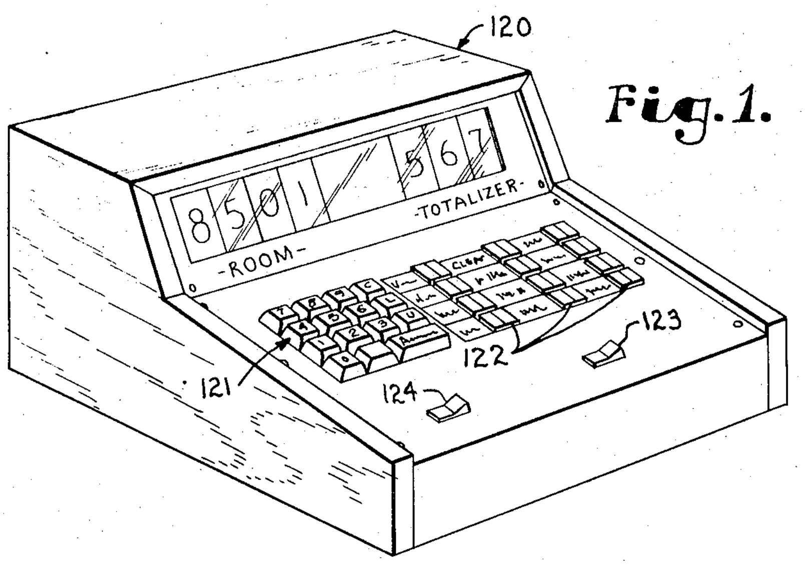
FIG. 1 is a perspective view of a master data terminal.

The master data terminal is shown in FIG. 1 and is generally represented by the numeral 120. Such a terminal could be used by individuals at a number of different stations in a large hotel or other complex such as the manager, front desk, housekeeping or other security or admittance personnel. The first four digits (shown, as the numbers 8501) which appear on the electrically energized numerical display to represent the room number. The remaining digits on the right hand side of the display portion relate to the three (or more) digits of the totalizer. As will be seen, the totalizer will present instantaneous and continuous read out of the total various status combinations that may be selected on the selector switches 122. The numeral 121 is used to identify the push button keyboard. This keyboard has the numbers zero through nine (or dashes or letters) thereon, an advance button with the word ADVANCE thereon, an update button with the letter "U" (or word UPDATE), a lamp test button with the letter "L" and a clear button with the letter "C" all clearly identifying the particular button and function.

The above mentioned clear button C will operate to clear the entire room display while lamp test L will light all lamps associated with the numbers on the totalizer, room number display and one of the three groups e.g., first status, second status, third status and fourth status. Accordingly, the lamp test must be depressed four times in order to check all of the status lights. The update button U updates a particular room from one status to another. It is necessary to depress the update button and a number to get the room to go from, for example, a vacant status to an occupied status. The advance button advances through the hotel room numbers in numerical sequence on the display.

The status switches are generally designated by the numeral 122 and are divided in half. One side of the switch will illuminate to indicate that a particular switch has been selected. Stated another way, when a particular switch is depressed, the light comes on to indicate that same has been actuated with the other side indicating the actual status of the room. As shown in FIG. 1, there are three independent fields with each field having a total of four statuses. These fields are arranged in push button columns and may be arbitrarily assigned certain titles. For instance, field 1, or the left hand column appearing on the master data terminal, might be utilized solely for front desk information. In this situation, status number one would refer to vacant rooms, status number two—occupied rooms, status number three—stay over rooms and status number four—reserved rooms. The front desk registrar would typically select only in the vacant status since these are the only rooms that are rentable. The second field (column of push buttons) could contain housekeeping information such as status one—clean, status two—dirty, status three—maid-in-room, status four—out-of-order rooms. Again, an example would be the selection of vacant and clean rooms. The third column or field is generally associated with room descriptors such as the price, number of beds, location, and the decor, etc. Therefore, if a customer at the front desk indicated that he wanted a particular priced room and was a single, the operator would depress the $16.00/single room button and totalizer would indicate to the front desk how many rooms were available having these conditions. In other words, the registrar would select vacant, clean, $16.00/single. The totalizer may read 156 thereby indicating the number of rooms having those particular conditions. If it is decided to rent a room to the individual, the update button would be depressed along with the status two or occupied button in field one. This would immediately decrease the totalized number by one in order to accurately give an instantaneous reading on the number and conditions of rooms now available for rent.

In the housekeeping section, the particular interest may be in the vacant, dirty rooms with all of the descriptors punched or depressed so as to inform housekeeping of the total number. By sequencing through the total number with the advance button, the particular room numbers would be indicated on the display.

This may be particularly advantageous to a hotel manager as he can select vacant, and clean to immediately find out how many rooms will be available for a particular evening. Likewise a selection can be made for vacant and dirty to indicate the number of rooms that will be potentially coming up for rental and in a similar manner occupied and clean may be selected as a census of how many are staying in the hotel as well. Stay over clean indicate the number of guests staying over. This information can be particularly useful in optimizing work forces and in maximizing the salability of rooms.

The master data terminal includes a selector switch 123 which will permit either field one, field two or field three to be updated depending upon where the machine is located. Also, it is possible to use a reset switch 124 to reset an entire group of rooms to a different status. For instance, at some time during the night it may be desirable to change the status of all of the occupied clean rooms to the occupied dirty state. By utilization of a reset switch in conjunction with a reset switch on the computer, the entire group is able to have its status changed. An enter switch on the master data terminal is used in conjunction with an enter switch on the computer that will permit the memory to be programmed by keyboarding the various room numbers desired, depressing the advance button and recording this information in the memory.

A somewhat smaller data terminal referred to as an "input" data terminal will also be used with the system. There will be no status selection switches or totalizer read out. The input data terminal will only include the keyboard arrangement to enter rooms therein, advance the room numbers, update, clear and test. Also, a status display is utilized to indicate the status of the room being displayed, the first digit indicating the status of the first field, the second digit indicating the status of the second field, and the third digit indicating the status of the third field. This information would appear in place of the totalizer as shown in FIG. 1. In other words, the above described master data terminal will permit a selection of a vacant and a clean room and will advance the room numbers only to those that are vacant and clean. Therefore, the number may jump from 1234 to 1256 since the rooms in between there may not meet the particular criteria. The input data terminal will indicate each and every room in sequence. Both data terminals will permit the user to start with any particular number selection. For example, if it is desired to start at the 4000 section, the user can punch in 4101 and begin sequencing throughout the particular area.

Figure 13:
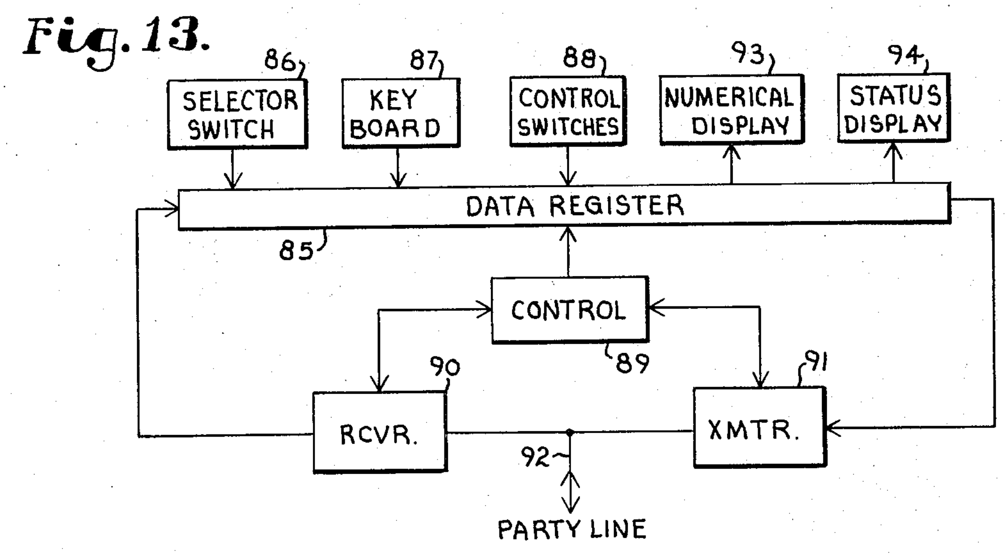
FIG. 13 is a block diagram of a typical data terminal and its interrelationship with the overall system.

The above described data terminals are indicated in more detail in FIG. 13. For example, the data terminal will include a data register 85 and will have various devices tied thereto. The data register takes information from the operator in the form of the setting of the selector switches 86, the keyboard 87 and the various other control switches 88. When the control circuitry 89 receives information from receiver 90 that it is time for this particular unit to put data on the party line, the control circuitry 89 takes this information and sends it out through transmitter 91. The transmitter delivers the information via party line 92 where the main programmer performs the necessary functions on the information, and sends it back to the receiver to the data register 85. At this point the data register can now feed the information into a numerical display 93 and a status display 94. Again, the party line will correspond to a 50 ohm coaxial cable that will tie the programmer (main from computer) to each and every data terminal and line receiver.

A status board similar to a device shown in FIG. 8 may be utilized with the system at any location to give a visual indication of the status of the various rooms. For example, large hotels sometimes have housekeeping substations where an inspector, in conjunction with five to 10 maids, is in charge of a hundred or more rooms. At this housekeeping substation, a status board may display all the necessary information concerning the 100 rooms that are the responsibility of the particular substation. As a result, the constantly updated data enables optimum utilization of the smallest possible work force and insures adequate and almost instantaneous updating of the status of each individual room.

Figure 2:
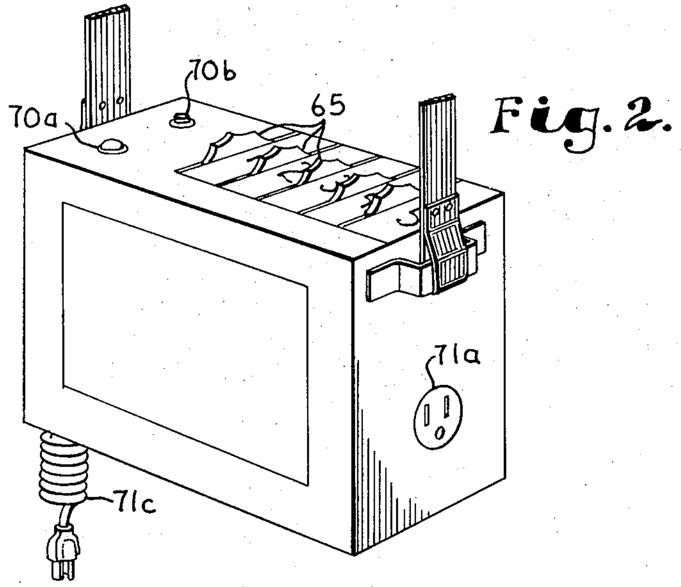
FIG. 2 is a perspective view of a portable data transmitter.
Figure 3:
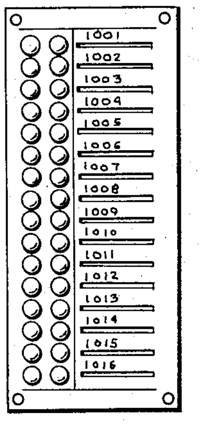
FIG. 3 is a front elevational view of a typical status board.

The portable transmitter is shown in FIGS. 2 and 12 and will contain a plurality of thumb wheel selector switches generally represented by the numeral 65. These swtiches will permit the user of same to select any four (or less) digit number representing a room number and will further permit the selection of a particular status number. It is contemplated that the first four thumb wheel switches on the transmitter shown (FIG. 2) will be utilized for the four digit room number while the fifth thumb wheel selector switch may be rotated to any number depicting a status condition which properly designates the current condition of a particular room.

In operation, the thumb wheel selector switches 65 permit the particular room number and status to be entered in digit form. However, the information is eventually transmitted in binary coded decimal (BCD) form as it is first delivered through diodes 66 and from thence to an encoder board 67. The encoder board takes the digit information and formats it by frequency shift keying (FSK) into a particular code by determining the first significant digit, the second significant digit, etc. Suitable codes are generally of the self-clocking type such as pulse width, Manchester, and bi-phase. The encoder 67 is connected to voltage controlled oscillator (VCO) 68 (see FIG. 12) which puts out the particular frequency for transmission purposes, generally two frequencies between 50 and 150 Khz. The VCO delivers its signal to the AC line matching network 69 which is similar to the circuitry shown in FIG. 4. The line matching network in turn interconnects with the conventional wall outlet 69*a* including the neutral and ground lines for data transmission purposes. A transmit light network 70 operates to illuminate light 70*a* when the push-to-transmit button 70*b* has been depressed and the data is actually transmitted. Finally, this circuit will include a conventional power supply 71 with a five volt regulator 72 interconnected with the encoder and the VCO. The power supply also is directed to the AC matching network 69.

Figure 4:
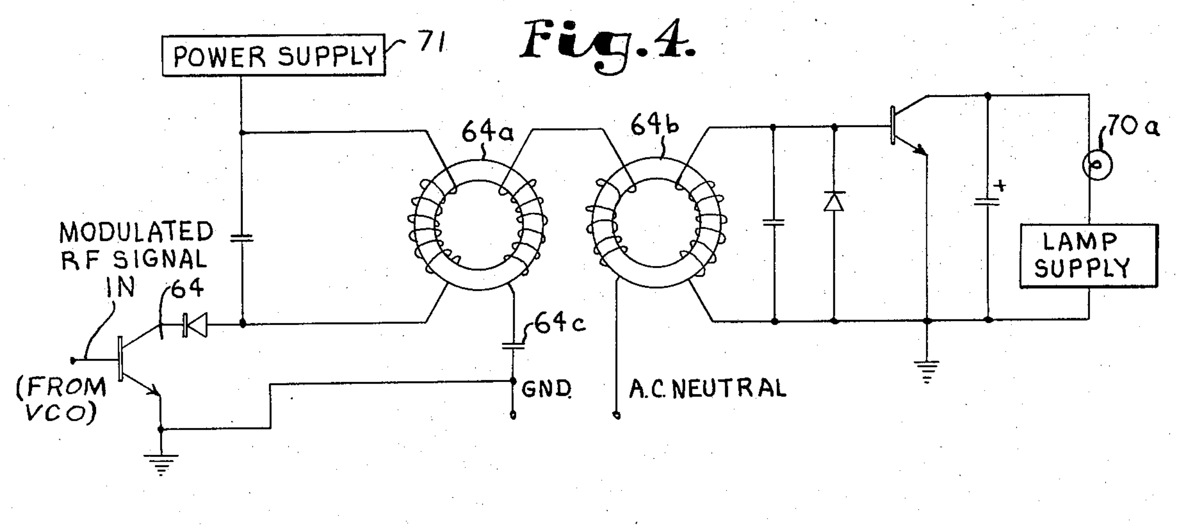
FIG. 4 is a partial schematic view of the driver portion of the transmitter with the indicator light and lamp supply being also schematically shown.

The FIG. 4 circuitry will enable the transmitter to properly match the AC power line. As suggested, the modulated RF signal is applied to the base of the power transistor 64 which amplifies the signal and delivers same to a pair of toroids 64*a* and 64*b*. The toroids provide for impedance transformation to match the output circuit impedance to the AC line impedance and for protection of the output transistor from transients caused by engaging the 115 volt power lines.

Capacitor 64*c* and the primary winding of the second toroid 64*b* combine to resonate at the center frequency of operation. The secondary of toroid 64*b* feeds the circuit which detects the impedance match to the AC line and will illuminate the lamp 70*a* in accordance with the transmitted power as mentioned above.

Returning once again to FIG. 2, it is seen that a retractable cord 71*c* extends from the housing of the portable transmitter and provides the interconnection into the AC neutral and ground. The retractable cord may be stored for convenience in the false receptacle 71*a* in the transmitter housing and as such is not interconnected with any wires.

The receiver associated with the AC power lines is shown in FIG. 6. Here it is indicated that the RF signal from the AC line is delivered to an impedance matching network 100 which matches the impedance of the AC power line to the first receiver band pass filter 101. Filter 101 is designed to pass a desired frequency while attenuating all others and its response to impulses must be such that there is as little ringing as possible. The signal is then amplified by video-amplifier 102 and filtered again in the band pass filter 103. This second filter 103 is not as critical since the signal has now been substantially normalized.

While any type of modulation can be used, it has been found that broad band frequency modulation gives the best results. The extraction of digital data from frequency shift keying is then accomplished. The frequency modulated RF is fed through a comparator 104 which changes the signal from an RF sign wave to an RF square wave. A multivibrator and integrator 105 then insures that all the square wave pulses have equal widths. The equal width pulses are now at two different frequencies so that the duty cycle (pulse width times frequency) for each is different. The pulses are integrated so that when the duty cycle changes (frequency change), there will be an output from a Schmitt trigger circuit 106 that is either a digital one or a digital zero. Once digital data is in the "one" and the "zero" form, the remainder of the circuitry takes over to decipher the coded information.

The above mentioned data recovery scheme utilizes pulse width modulation to simultaneously record data and to clock information. The clock recovery 107 is used to shift data into a temporary holding register 108. A control mechanism 109 is strobed at the end of any data word that comes into register 108 to enable the control system to transfer data from the temporary register 108 to a register 110 for use on the party line 113. This register (110) is a data and control register which also contains information for the programmer as to what the programmer is to do with the particular data received on this particular receiver. For example, one receiver can be used to control a front desk field or any of the other possibilities. The control mechanism 109 also takes the information from the party line receiver 111 to determine when it is to take data from the data control register 110 and transmit same through a party line transmitter 112 onto the party line 113 and into the programmer.

Figure 10:
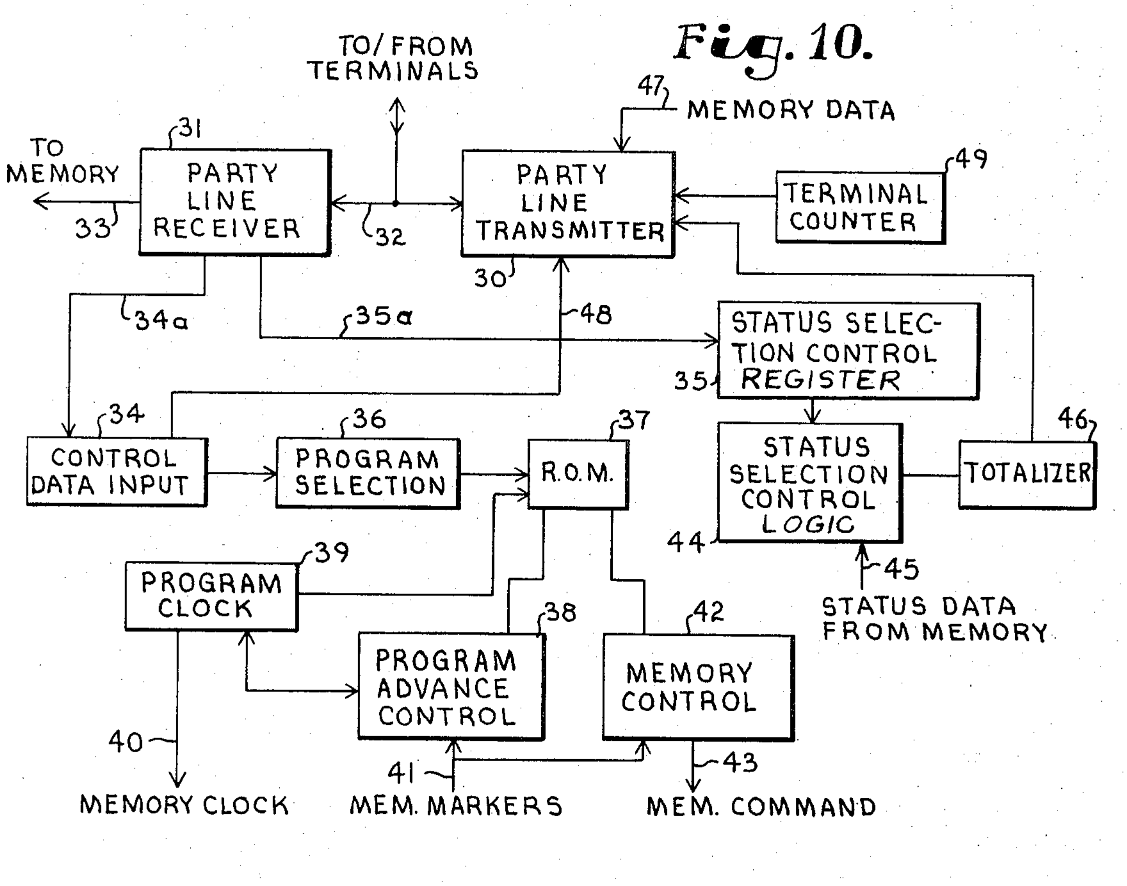
FIG. 10 is a block diagram of the programmer showing its interrelationship with the transmitter, receiver and memory.

The functional block diagram of FIG. 10 generally illustrates the operation of the programmer identified by the numeral 22 of FIG. 9. As mentioned, the programmer operates to send out a signal to a data terminal by means of a party line transmitter 30. Transmitter 30 has an address code for each data terminal in that system. The response from the particular unit comes into party line receiver 31 via party line 32 and is in serial form. These party line receiver 31 outputs are in the form of a time division rather than specifically separate lines. For convenience of illustration, a description of a particular room that the unit is presently concerned with is sent via line 33 to the memory. Further, a control data input 34 receives another input from the party line receiver (as diagrammatically shown by the line 34*a*), said input describing to the main computer what is to be done with the information. Finally, data is transmitted to the status selection data register 35 (this transmission being diagrammatically indicated by the numeral 35*a*) in a form that will represent the combination of various statuses that the computer may wish to process. For instance, if it is desired to search for clean and vacant rooms, the appropriate data bits will be sent into the status selection data register 35 to essentially say that information concerning "clean rooms that are also vacant" is desired.

The control data input 34 has a functional output to a decoding circuit 36 further identified as program selection. This portion of the circuit has a binary code that is delivered to the read only memory 37. The read only memory (R.O.M.) starts at a predetermined time described by the program selection 36 and delivers information to the program advance control 38 telling the unit how long it is to execute a particular command. The program advance control in turn operates on program clock 39 to advance the programmer as required. The program clock 39 also sends out a continuous stream of clock pulses along the line designated by the numeral 40 to the memory and, in effect, operates to advance the memory through its list of room numbers and previously set in room statuses. In other words, the clock pulses on line 40 advances the memory to the next succeeding room numbers and correlates same via the program advance control 38 with the memory markers on line 41. For instance, the data that went out on line 33 to the memory might compare at some particular time to a room number that happens to be coming up in the memory. If this occurs, a marker will come into the program advance control on line 41 indicating that at this point the unit may go to the next step.

The above mentioned markers also go to the memory control 42 which operates to instruct the memory via line 43 as to what to do on a particular room number at is comes up. It can instruct the memory to (1) load the data that is in the shift register data field into the memory; or (2) load the room number into the memory; or (3) it can load a blank room into the memory thereby erasing the room from the memory. Additionally, it can load the data that is in the memory onto the shift register associated with the memory. The data from the status selection control register 35 is affected by the control logic in the status selection control section 44 which in turn operates on status information from the memory directed thereto via line 45. The comparison between the data register and the data from the memory is then fed into the totalizer 46. At the same time, the above mentioned memory marker will go to the program advance control section 38 as a possible step for advancing in the program. Data from the totalizer 46, data from the memory on line 47, data from the control data input register on line 48, and also data from the terminal counter 49 are all fed into the party line transmitter device 30 for transmission back to the master terminals or the receiver at the conclusion of the program or at the execution of the program.

Figure 11:
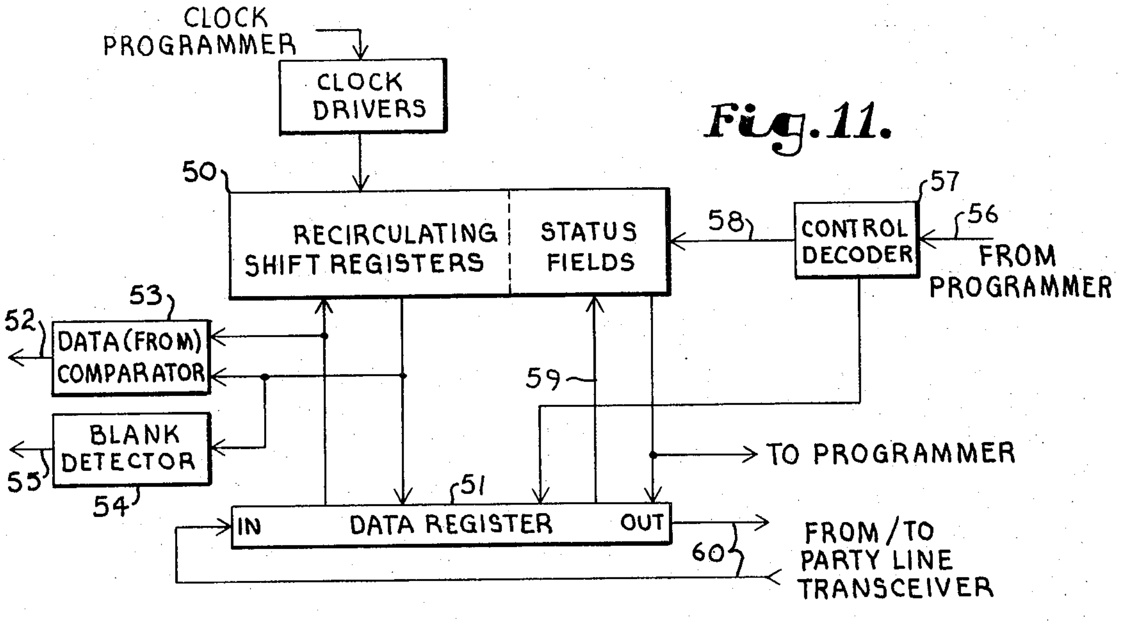
FIG. 11 is a block diagram showing the operation of the recirculating memory.
Figure 15:
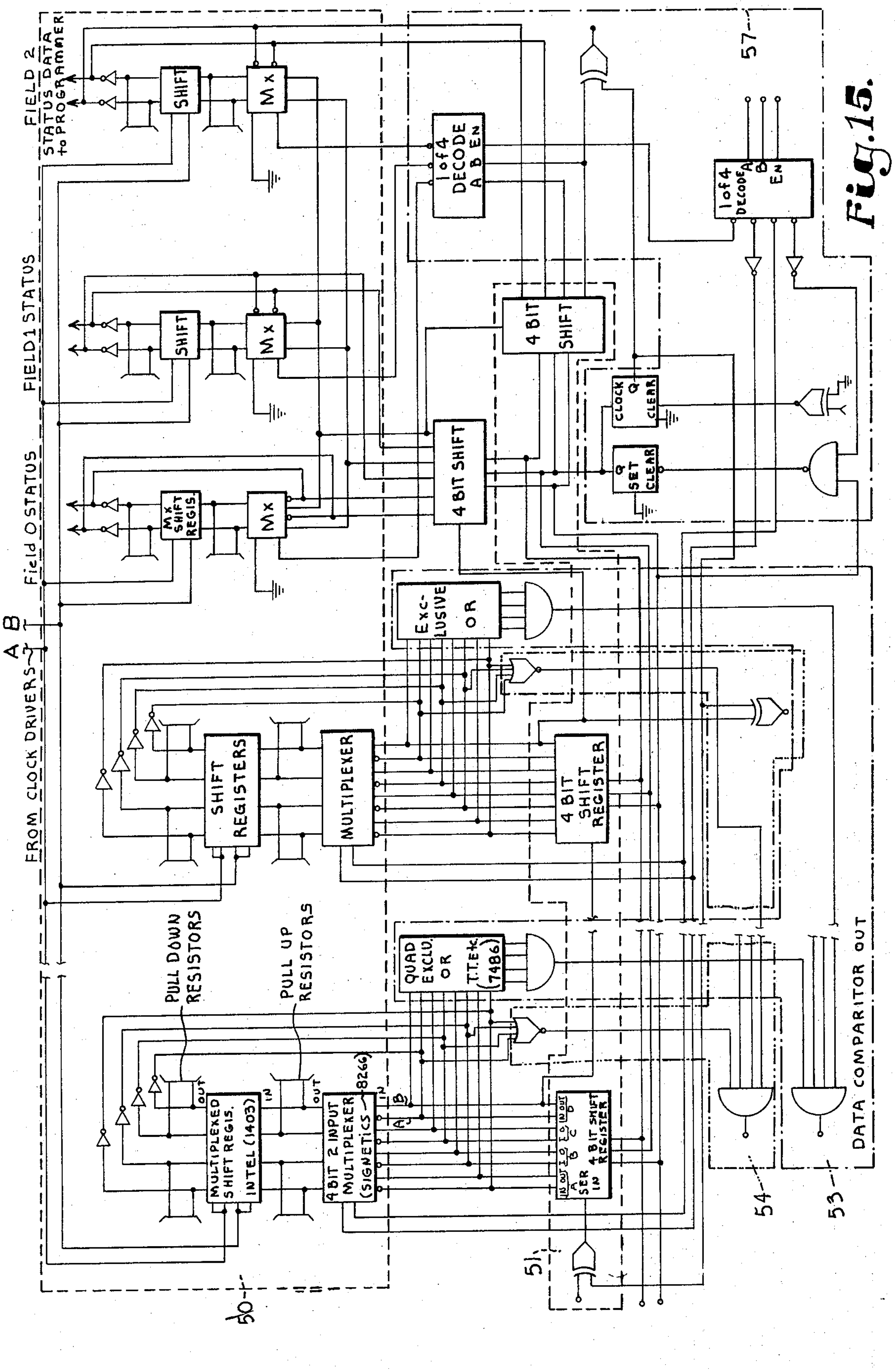
FIG. 15 is a schematic diagram of the remainder of the recirculating memory with portions of the memory being eliminated as the eliminated portion is substantially repetitive.
Figure 14:
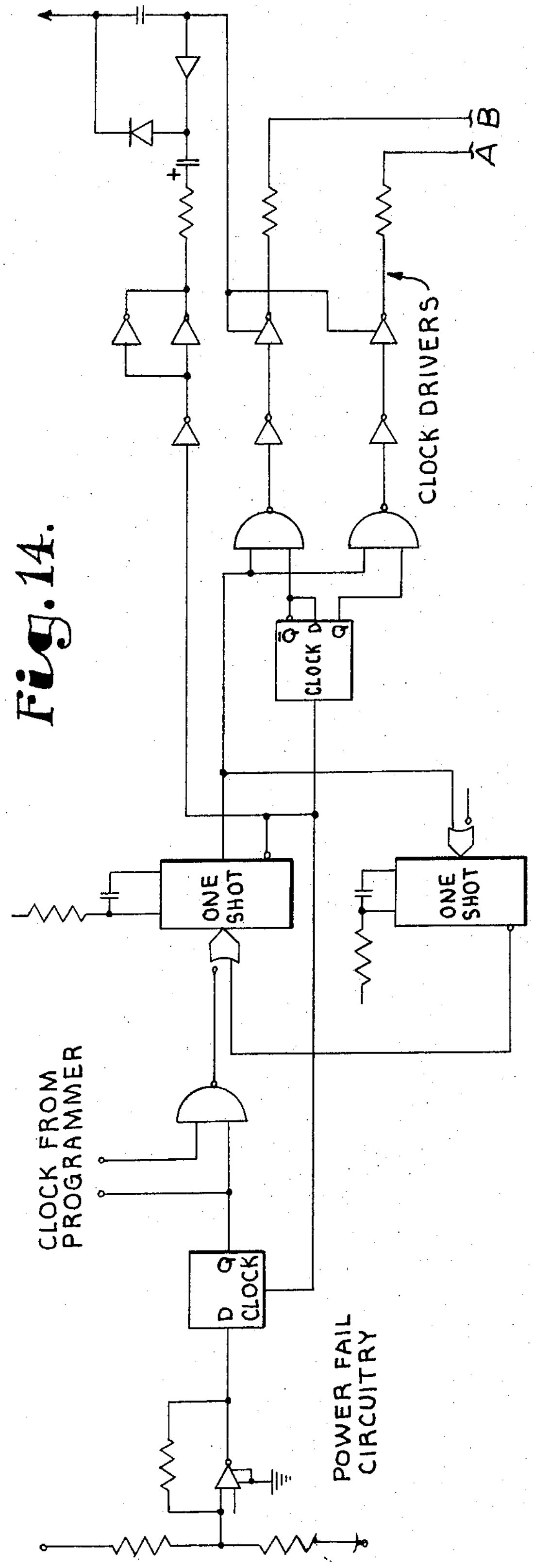
FIG. 14 is a schematic diagram of the clock driver for the recirculating memory.
Figure 16:
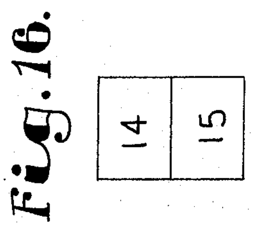
FIG. 16 is a plot indicating how FIGS. 14 and 15 should be arranged for proper viewing.

The memory shown in FIG. 11 (also note FIGS. 14 and 15 for more complete circuit showing) has particular utility with the subject room status and control system. By utilizing recirculating shift registers 50, circuit components have been reduced since the subject memory has the ability to communicate with a thousand words of data on the 16 wires or the number connections that are inherent in a shift register. By comparison, a random access memory with 16 data bits for addressing coming in from the next terminal source, some 65,000 different data words may be required to describe each room status. With the utilization of the above mentioned recirculating shift register and the comparison of data coming in on data register 51 to the data already stored in the recirculating shift registers, this excessive capacity is not required. Each word in the recirculating shift register memory has one field that is primarily used for addressing according to room number and a second group of fields which represent the status of each room. In a prototype unit, a combination of 22 shift registers provides the 16 bits of addressing for the room numbers and three separate two-bit fields containing status bits which describes the individual condition of the room e.g., whether it is occupied, vacant, stay over, dirty, clean, main-in-room, out-of-order, etc. In this way a thousand room hotel using four digit room numbers has a 1K by 22 memory rather than the less efficient 64K by six random access memory.

It has been found convenient to use three different fields with four statuses in each field. However, statuses per field are expandable as are the number of fields. The four statuses correspond to two bits within a particular field. Since there are three fields, the device is actually using six bits of data within the status field indicating the use of six different shift registers operating at the same time as the 16 shift registers represent the room numbers. Therefore, every time the programmer 22 instructs the memory to advance one room, the memory advances all 22 shift registers one step. At the time that the memory advances, data is compared in the address portion of the shift register storage to the address portion of information coming in on data register 51 and, if there is a positive comparison, that condition is transmitted from data comparator 53 on line 52 as one of the markers going to the program advance (see FIG. 10). Actually, the data comparator is an AND gate with 16 inputs coming from 16 individual comparators. Also, the device looks at each individual word in the memory to decide whether or not it is a blank room (one that does not actually exist as far as the hotel is concerned). Accordingly, a standard 1,024 bit shift register can be used for hotels that operate with less than 1,024 rooms. A blank condition in a particular memory is in an all ones condition for all 16 shift registers corresponding to the addressing portion of the recirculating shift registers. The blank detector 54 simply detects the room number that corresponds to the absence of a room by detecting all ones condition and sending that information out on line 55. The output blank detector is another marker into the program advance control 38 in FIG. 10.

The programmer brings commands into the memory unit via line 56. These commands are decoded by the control decoder 57 to provide execution commands to various portions of the recirculating shift registers. The line 58 generally represents a multi-bit control that can control individual status fields in such a fashion that is can take data from the data register along line 59 and write it into a particular field. These control signals, from control decoder 57, can also take information from the data register 51 representing a room number and write that into the recirculating shift registers. A blank descriptor can also be written into the room number section of the recirculating shift registers. The lines indicated by the numeral 60 go to and from the party line transceiver which represents data going in and out of the memory section and to or from the various data terminals. A typical sequence of operations is the one following the depression of the ADVANCE button on a data terminal. First the programmer places a word containing the address of the data terminal on the party line. The data terminal sends back a word containing the room number on the display, the code of the ADVANCE button, a sequence of bits corresponding to the depression of status selectors, and supplementary control bits including a bit corresponding to the fact that a new button has been depressed. The party line receiver shifts this word into the programmer and memory. At the end of the shifting operation, the room number ends up in the memory, the code of the Advance button and the control bit corresponding to the new button depression end up in the programmer, and the bits corresponding to the setting of the selector switches ends up in the status selection control.

The combination of the Advance button code and the "new button" bit calls up the Advance program in the ROM by suitable encoding of the control data into an address by the program selection logic. The first step called up by the ROM enables a sequence of clocking signals to the memory which continues until the data comparator indicates a comparison between the address portion of the memory shift registers and the room number from the data terminal. At this point the advance control logic (primarily a multiplexer controlled by the ROM) passes a pulse to the program clock which advances the ROM to the next step. This step allows a series of clock pulses to the memory until the status selection control correlates the status data from the memory with the status button depressions as indicated by the status selection control. At this point the memory control instructs the memory unit to load into its data register 51 the room number and status. After this step, data is ready and is passed by the party line transmitter back to the data terminal which sent it.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A transmitter for a room status and control system, said transmitter comprising means for encoding digital data, a power cord, said power cord operable to interconnect said transmitter to a AC power line, and means for initiating the transmission of said encoded digital data on said transmitter through said power cord and onto the neutral and ground of said power line.

2. A method of transmitting data and indicating room status in a potentially electrically noisy environment such as a hotel, office building, apartment complex or hospital, said method including the steps of encoding information relating to a room number and status of said room or occupant thereof, transmitting said encoded information on an AC power line associated with a building structure having the room with said status therein using the neutral and ground of said AC power line, receiving said transmitted information, and indicating the status of said room.

3. The combination as in claim 2 including the step of storing said received information prior to indicating said status of said room.

4. The combination as in claim 2 including the step of visually displaying the total number of rooms having preselected status conditions, said status conditions having one or more characteristics.

5. The combination as in claim 4 including the step of visually displaying the numbers of said rooms having a preselected status condition.

6. The combination as in claim 5 including the step of displaying said room numbers in sequential order that correspond to one or more status.

7. The combination as in claim 3 including the steps of visually displaying the total number of rooms having a preselected status condition, and visually displaying the numbers of said rooms having certain status conditions.

8. The combination as in claim 3 including the step of recirculating at least a portion of said transmitted information when said information is stored.

9. A system as in claim 2 wherein said status information corresponds to fire or burglar alarm conditions.

10. A system for transmitting and indicating status of rooms or areas or occupants therein in a building or building complex, said system comprising a transmitter being capable of transmitting signal information on the neutral and ground of a power line associated with said building or building complex, said signal information containing data relating to a room or area designation status of said room or area or occupant thereof, a receiver means receiving said signal information, said signal information having been transmitted at least partly on said neutral and ground of said power line, and means for indicating the status of said room or area or occupant thereof corresponding to the transmitted signal information.

11. The combination as in claim 10 wherein said transmitter includes a means for encoding a plurality of status conditions for each room or area, and means associated with said receiver for correlating and retrieving data pertaining to preselected status conditions and to thereby cause said indicating means to indicate only said rooms having a preselected status.

12. A combination as in claim 10 wherein said transmitter includes a means for encoding a plurality of status conditions for each room or area, and memory means associated with said receiver for storing data corresponding to said room status, and means for correlating and retrieving data from said memory means to thereby cause said indicating means to indicate only said rooms having said preselected status.

13. The combination as in claim 10 wherein said system includes a memory means associated with said receiver for storing information corresponding to said room status.

14. The combination as in claim 13 wherein said memory means includes a plurality of recirculating shift registers, said shift registers having two sections, one of said sections representing data and the other of said sections representing address, a data register, said data register capable of storing the address of a preselected data word read out of said data section of said recirculating shift registers, a data comparator interconnected between the address section of said shift registers and the data register, said data comparator having an output when the data in the address section of said shift registers corresponds to the data in the data register thereby indicating that a data field of the recirculating shift register is a correct field for read out or updating.

15. The combination as in claim 14 including a means for subdividing said data fields into smaller fields which can be independently updated or read out.

* * * * *

UNITED STATES PATENT OFFICE

CERTIFICATE OF CORRECTION

Patent No. 3,810,096 Dated May 7, 1974

Inventor(s) Jules M. Kabat and James H. Beggs

It is certified that error appears in the above-identified patent and that said Letters Patent are hereby corrected as shown below:

Col. 2 -- line 30 -- "At" should be --An--.

Col. 3 -- line 36 -- "suitably" should be --suitable--.

Col. 4 -- line 9 -- "xcept" should be --except--.

Col. 5 -- line 14 -- "to" should be --the--.

Col. 13 -- line 59 -- "at is" should be --as it--.

Col. 14 -- line 39 -- "main-in-room" should be --maid-in-room--.

Col. 15 -- line 14 -- "is" should be --it--.

Signed and sealed this 8th day of October 1974.

(SEAL)
Attest:

McCOY M. GIBSON JR.
Attesting Officer

C. MARSHALL DANN
Commissioner of Patents

USCOMM-DC